United States Patent [19]

Christenson et al.

[11] 4,249,461
[45] Feb. 10, 1981

[54] VENTILATING SYSTEM FOR A LIVESTOCK BUILDING

[76] Inventors: Larry E. Christenson, 903-10th St., Kalona, Iowa 52247; Rick W. Dripps, R.R. 1, Ainsworth, Tex. 52201; John E. Gillette, P.O. Box 604, Kalona, Iowa 52247; Mark S. Mittleberg, 1528 Tracy La., Iowa City, Iowa 52240

[21] Appl. No.: 50,767

[22] Filed: Jun. 21, 1979

[51] Int. Cl.³ ............................................. F24F 7/06
[52] U.S. Cl. .................................. 98/38 R; 98/33 A; 98/38 F; 119/21
[58] Field of Search .................. 98/33 A, 38 R, 38 A, 98/38 B, 38 E, 38 F, 40 C, 40 D; 119/16, 21

[56] References Cited

U.S. PATENT DOCUMENTS

| | | | |
|---|---|---|---|
| 2,079,304 | 5/1937 | Polderman | 98/33 A |
| 2,477,619 | 8/1949 | Kennedy | 98/38 E |
| 3,611,908 | 10/1971 | Spoormaker | 98/40 D X |
| 3,747,501 | 7/1973 | Honda et al. | 98/33 A |

FOREIGN PATENT DOCUMENTS

| | | | |
|---|---|---|---|
| 295979 | 5/1932 | Italy | 98/40 |
| 571825 | 1/1958 | Italy | 98/40 |

Primary Examiner—Albert J. Makay
Assistant Examiner—Harold Joyce
Attorney, Agent, or Firm—Zarley, McKee, Thomte, Voorhees & Sease

[57] ABSTRACT

A ventilating system for a livestock building includes a substantially enclosed building structure having a ceiling with an attic compartment above it and a livestock compartment below it. An elongated air conduit extends through the building structure substantially parallel to the ceiling and has at least one elongated slot extending substantially the length thereof. A fan or the like circulates air in the livestock compartment through the conduit and outwardly through the slot with a baffle adjacent the slot directing the air exiting therefrom upwardly towards the ceiling. An elongated opening in the ceiling in close proximity and parallel to the conduit is provided for bringing a source of fresh air into the livestock compartment and an air deflector is provided for mixing the fresh air with the circulated air passing through the slot.

15 Claims, 4 Drawing Figures

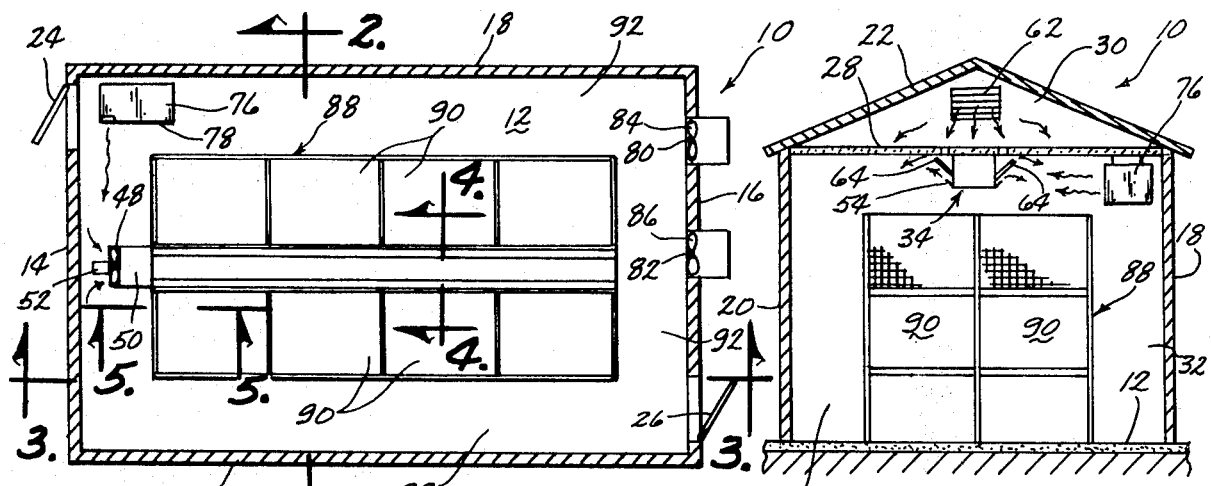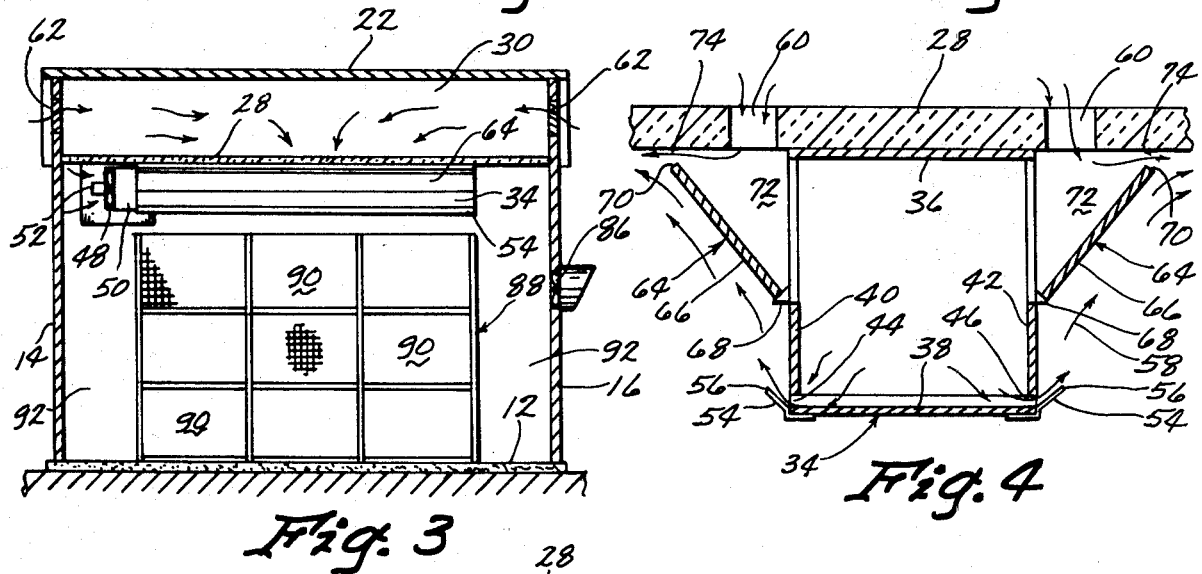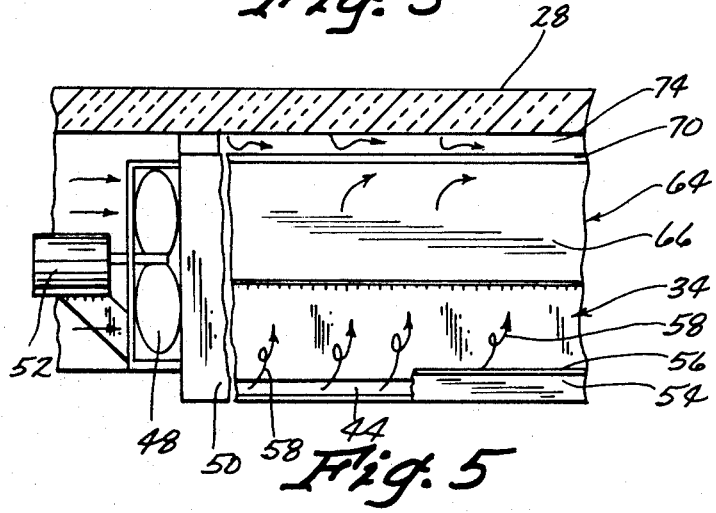

VENTILATING SYSTEM FOR A LIVESTOCK BUILDING

BACKGROUND OF THE INVENTION

This invention relates generally to ventilating systems and more particularly to an improved ventilating system for a livestock confinement building.

Cage rearing of certain livestock such as hogs has become increasingly popular due to such advantages as improved production efficiency, the production of more uniform pigs and overall economy. In addition, cage rearing has become a proven management tool for the critical post-weaning period.

A problem associated with hog confinement buildings for example, is to control the heating and ventilation within the building to provide the young and rapidly growing pigs with an environment most favorable to their overall performance. The temperature within such a building tends to be higher near the ceiling and lower near the floor as well as to vary with the seasons. Furthermore, it is a problem to provide proper ventilation without creating drafts which will be detrimental to animal health.

Accordingly, it is a primary object of the invention to provide an improved ventilating system for a livestock building.

A further object is to provide a livestock building ventilating system which provides a favorable environment for animal growth.

Another object is to provide a ventilating system which maintains a stable interior environment in a livestock building.

A related object is to provide a ventilating system which is substantially uneffected by seasonal variance of the outside climate.

Another object is to provide a ventilating system which eliminates drafts while providing necessary ventilation.

Another object of the invention is to provide a ventilating system which produces only a minimum variance in temperature between the top and bottom of the building.

A related object is to provide a ventilating system adapted for a multi-level cage facility.

Another object is to provide a ventilating system wherein fresh ambient air is pretempered prior to introduction into the building.

Another object is to provide a ventilating system for a livestock building wherein air is directed in a substantially laminar flow outwardly along the ceiling.

Finally, an object of the invention is to provide a ventilating system which provides an efficient, continuous, uniform, and draft free distribution of warm fresh air throughout a livestock building.

SUMMARY OF THE INVENTION

The ventilating system of the present invention is adapted for a substantially enclosed livestock building having a ceiling with an attic compartment above it and a livestock compartment below it. An elongated air conduit which extends through the building substantially parallel to the ceiling has at least one elongated slot extended substantially along its length. Air in the livestock compartment is circulated through the conduit, outwardly through the slot and against a baffle which directs the air upwardly towards the ceiling. At the same time, fresh ambient air from the attic compartment is drawn into the livestock compartment through elongated openings in the ceiling for abutment against a deflector which causes the fresh air to be mixed with the recirculated air passing through the elongated slot of the conduit. An opening may be provided in one wall for exhausting air from the building and a heater unit may be provided for controlling the temperature within the building. The elongated conduit draws directly from the heater and from the livestock compartment environment and directs this recirculated air toward the ceiling where it is mixed with incoming fresh air. The result is an efficient pretempering and a continuous uniform and draft free distribution of warm air throughout the building so as to render the building ideally suitable for housing a multi-level cage facility.

BRIEF DESCRIPTION OF THE DRAWINGS

FIG. 1 is a top sectional view of a livestock building with the ceiling and roof structure removed to expose the structure therebelow;

FIG. 2 is an end sectional view taken along line 2—2 in FIG. 1;

FIG. 3 is a side sectional view taken along line 3—3 in FIG. 1;

FIG. 4 is an enlarged detail sectional view of the elongated air conduit and associated structure as seen on line 4—4 in FIG. 1; and FIG. 5 is an enlarged detail side sectional view taken along line 5—5 in FIG. 1.

DESCRIPTION OF THE PREFERRED EMBODIMENT

With reference to the drawings, the livestock building ventilating system of the present invention includes a substantially enclosed building structure, indicated generally at 10, having a floor 12, a front wall 14, a rear wall 16 and opposite sidewalls 18 and 20 covered by a roof structure 22. The walls 14, 16, 18 and 20 form a generally continuous wall structure having front and rear access doors provided therein as indicated at 24 and 26 in FIG. 1. A ceiling 28 extends across an upper portion of the housing to define an attic compartment 30 between the ceiling 28 and roof structure 22 and a livestock compartment 32 between the ceiling 28 and floor 12.

An elongated air conduit 34 is secured to the underside of ceiling 28 at a position transversely centered thereon. The air conduit 34 runs parallel to the ceiling and extends along a substantial portion of the ceiling length. Whereas the cross sectional shape of air conduit 34 is not critical to the present invention, a preferred generally rectangle section conduit is shown in FIG. 4 which includes a top wall 36, a bottom wall 38 and opposite sidewalls 40 and 42. A pair of elongated slots 44 and 46 are provided in the sidewalls 40 and 42 respectively adjacent bottom wall 38. The slots 44 and 46 provide for air flow from conduit 34 into the livestock compartment 32 in a manner described hereinbelow.

An air circulation fan 48 is operatively supported at the forward end of conduit 34 with a fan housing 50 interposed therebetween for channeling air from the fan into the forward end of conduit 34. Fan 48 may be driven by an electric motor 52, for example, and draws air from the forward portion of livestock compartment 32 for circulation through air conduit 34 and the remainder of the livestock compartment as described hereinbelow.

Referring to FIG. 4, a pair of baffles 54 are secured to air conduit 34 adjacent the slots 44 and 46 for directing air exiting through the slots upwardly towards the ceiling 28. Each baffle is secured at its lower end to the conduit below the adjacent slot 40 or 42 and extends upwardly and outwardly therefrom to terminate at an upper edge 56 which is positioned higher than and laterally spaced from the adjacent slot 44 or 46. The effect of the baffles 54 is to direct air exiting from the slots 44 and 46 upwardly towards the ceiling 28 as indicated by arrows 58 in FIGS. 4 and 5.

Ceiling 28 is provided with a pair of elongated openings 60 which are positioned in close proximity and parallel to opposite sides of air conduit 34, as shown best in FIGS. 2 and 4. Ceiling opening 60 also extends substantially the length of air conduit 34 for bringing a source of fresh air into the livestock compartment 32. Fresh ambient air enters the attic compartment 30 through relatively large vent apertures 62 in the front wall 14 and rear wall 16 respectively as shown in FIGS. 2 and 3.

A pair of deflectors 64 are supported below the ceiling openings 60 as shown in FIGS. 2 and 4 for the purpose of deflecting the fresh air passing through the openings so that the fresh air will mix with recirculated air passing through the slots 44 and 46. Each deflector 64 comprises an elongated deflector plate 66 secured at its lower end to the air conduit 34 by a suitable hinge 68 or the like which closes the juncture between the air conduit and deflector plate. The plate extends upwardly and outwardly from the conduit to terminate at an upper edge 70 positioned in clearance relation from the ceiling 28 and laterally outwardly from the ceiling opening 60. Accordingly, fresh air from ceiling opening 60 enters a fresh air channel 72 from which it is directed laterally through the clearance 74 between the plate 66 and ceiling 28 for mixture with the upwardly flowing recirculated air from slots 44 and 46. The deflectors can be adjustably pivotally positioned about hinge 68 by conventional means (not shown).

A heater 76 is provided at the forward end of the building structure 10 adjacent ceiling 28. The heater unit outlet 78 is preferably oriented for radiating heat toward the air circulation fan 48.

Air within the livestock compartment 32 may be vented to the outside atmosphere through exhaust openings 80 and 82 in rear wall 16. Exhaust fans 84 and 86 may be operatively mounted within the openings 80 and 82 to force air from the livestock as needed.

Housed within the building structure 10 is a tri-level cage facility, indicated generally at 88 including two rows of stacked cages 90 situated back-to-back so as to be surrounded by a continuous open aisle-way 92. The cages themselves are substantially constructed of open web panels which permit relatively free air flow therethrough. The arrangement of cages shown in the drawing may be utilized as a triple deck nursery system for young animals.

In operation, air circulation fan 48 is operated to draw air from the livestock compartment 32 and force it through the air conduit 34 for passage outwardly through slots 44 and 46. Baffles 54 deflect the recirculated air upwardly as indicated by 58 for mixture with the incoming fresh air from ceiling openings 60. The movement of recirculated air by fan 48 is operative to draw fresh air from the attic compartment 30, through openings 60 and outwardly through the clearance opening 74 for mixture with the recirculated air. Accordingly, the fresh ambient air is immediately pretempered at the point of introduction into the livestock compartment. The air conduit 34, baffles 54 and deflectors 64 are aerodynamically designed to create a laminar flow of air along the ceiling and over the cages. At sidewalls 18 and 20, this air drops into the aisle-ways 92 and integrates with the environment within the livestock compartment 32. The system thus eliminates drafts on the animals within the cages 90 while providing the necessary ventilation. In addition, tests of the ventilation system of the present invention have revealed a top-to-bottom cage temperature differential of under 2° F. so that a generally uniform temperature is established throughout the livestock compartment for animals in both the upper and lower cages.

In one embodiment of the invention, a 14'×22' housing has a 16' air conduit supported therein with an 800 cubit feet per minute air circulation fan. The air conduit measured 10"×11" inside diameter. Three and a half inch wide ceiling openings were provided with the elongated slots and clearance openings being approximately ⅞" wide. The baffles were oriented upwardly and outwardly at approximately 30° to the horizontal with the deflectors disposed at approximately a 45° angle.

Whereas preferred embodiments of the invention have been shown and described herein, it is evident that many alterations, modifications and variations may be made which come within the intended broad scope of the appended claims. For example, the shape of air conduit 34 may differ from that shown and the number and position of the various slots and openings may be modified so long as the mixture and circulation of air is effected as described herein.

We claim:

1. A ventilating system for a livestock building comprising,
   - a substantially enclosed building structure having a ceiling with an attic compartment thereabove and a livestock compartment therebelow,
   - an elongated air conduit extending through said livestock compartment substantially parallel to said ceiling,
   - at least one elongated slot in said conduit extending substantially the length of said conduit,
   - means for circulating the air in said livestock compartment through said conduit and outwardly through said slot,
   - a baffle adjacent said slot for directing air exiting through said slot upwardly towards said ceiling,
   - an elongated opening in said ceiling in close proximity and parallel to said conduit for bringing a source of fresh air into said livestock compartment, and
   - means for deflecting air passing through said elongated opening for mixing with said air passing through said slot.

2. The ventilating system of claim 1 wherein said means for circulating the air in said livestock compartment comprises a fan means at one end of said conduit, said fan means adapted to direct air from said livestock compartment into one end of and through said conduit and outwardly through said slot.

3. The ventilating system of claim 1 wherein said building structure further comprises a generally continuous sidewall which cooperates with said ceiling to define an enclosure, said sidewall having an exhaust opening through which air in the livestock compartment is exhausted to the atmosphere outside the building structure.

4. The ventilating system of claim 3 further comprising an exhaust fan operatively connected to said exhaust opening for forcing the air outwardly therethrough.

5. The ventilating system of claim 1 wherein said baffle comprises and elongated flange connected to said conduit at a position below said slot and extended upwardly and outwardly therefrom to a position higher than and laterally spaced from said slot.

6. The ventilating system of claim 1 wherein said elongated opening in said ceiling is substantially coextensive in length with said air conduit.

7. The ventilating system of claim 1 wherein said means for deflecting air comprises an elongated deflector plate having a lower end secured to said air conduit and an upper edge positioned in clearance relation from said ceiling and laterally outwardly of said ceiling opening whereby fresh air from said ceiling opening is directed laterally through said clearance between said plate and ceiling and laterally therefrom along the ceiling.

8. The ventilating system of claim 1 wherein said air conduit comprises an elongated top wall, a bottom wall and opposite sidewalls, said slot being formed through a lower portion of one sidewall.

9. The ventilating system of claim 1 further comprising an air heater unit within said livestock compartment.

10. The ventilating system according to claim 1 comprising two of said elongated slots, two baffles adjacent said respective slots, two ceiling openings on opposite sides of said air conduit and two means for deflecting air passing through said respective ceiling openings.

11. The method of ventilating a substantially closed livestock building having a ceiling with an attic compartment thereabove and a livestock compartment below, comprising
moving ambient air within the building in a substantially horizontal direction through a conduit adjacent said ceiling,
exiting at least some of said moving ambient air upwardly outwardly from said conduit towards said ceiling in a substantially continuous sheet,
introducing fresh air from outside said building through said attic and through said ceiling in a substantially continuous sheet substantially parallel to and adjacent said ceiling,
and mixing said sheets of ambient and fresh air.

12. The method of claim 11 wherein said sheets of ambient and fresh air are mixed in sufficient proportions to maintain a substantially uniform temperature gradient throughout the height of said livestock compartment.

13. The method of claim 11 wherein said sheets of ambient and fresh air are mixed adjacent said ceiling in sufficient proportions to maintain a substantially uniform temperature gradient throughout the height of said livestock compartment.

14. The method of claim 11 wherein said sheets of ambient and fresh air are mixed in sufficient proportions to maintain a substantially uniform temperature gradient throughout the height of said livestock compartment within a variation of 2° F.

15. The method of claim 11 wherein said fresh air is introduced through said ceiling adjacent said conduit.

* * * * *